Figure 1:
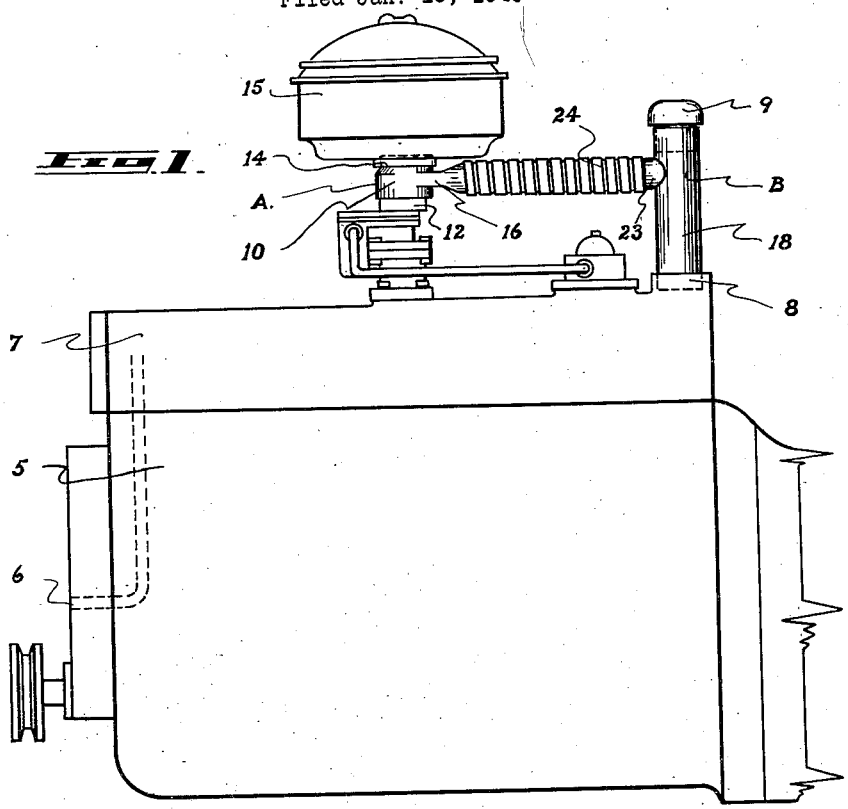

Feb. 22, 1949.　　　　　G. GRIFFITH　　　　2,462,634
CRANKCASE VENTILATOR FOR MOTOR VEHICLES
Filed Jan. 19, 1946

Inventor
GEORGE GRIFFITH
By　　　　Haskett
　　　　Attorney

Patented Feb. 22, 1949

2,462,634

UNITED STATES PATENT OFFICE 2,462,634

CRANKCASE VENTILATOR FOR MOTOR VEHICLES

George Griffith, Ottawa, Ontario, Canada

Application January 19, 1946, Serial No. 642,340

2 Claims. (Cl. 123—171)

My present invention relates to improvements in a crank case ventilator for motor vehicles and appertains particularly to one in which the water vapor, oil and gasoline fumes and products of combustion leaking into and/or accumulation in the engine crank case are drawn off and passed into the air stream entering the carburetor.

An object of the invention is to provide a crank case ventilator that will effectively and completely carry off the dangerous carbon monoxide and other gaseous fumes from the engine crank case, positively preventing the possibility of their seeping into the cab of the vehicle.

A further object of the invention is to provide a crank case ventilator that will feed into the air stream entering the carburetor all those combustible vapors and gases that have fuel and lubricating value and yet are normally wasted, thereby increasing gasoline mileage and engine economy and improving performance generally.

A further object of the invention is to provide a crank case ventilator comprising a pair of adapters connected by a length of flexible hose, one of the adapters attaching to the crank case breather and the other inserting between the air filter and air inlet of the carburetor, the whole being vendable as a kit for owner installation.

A still further object of the invention is the provision of a crank case ventilator of the nature and for the purposes described, that is characterized by structural simplicity, durability and efficiency and being capable of manufacture at reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 2:
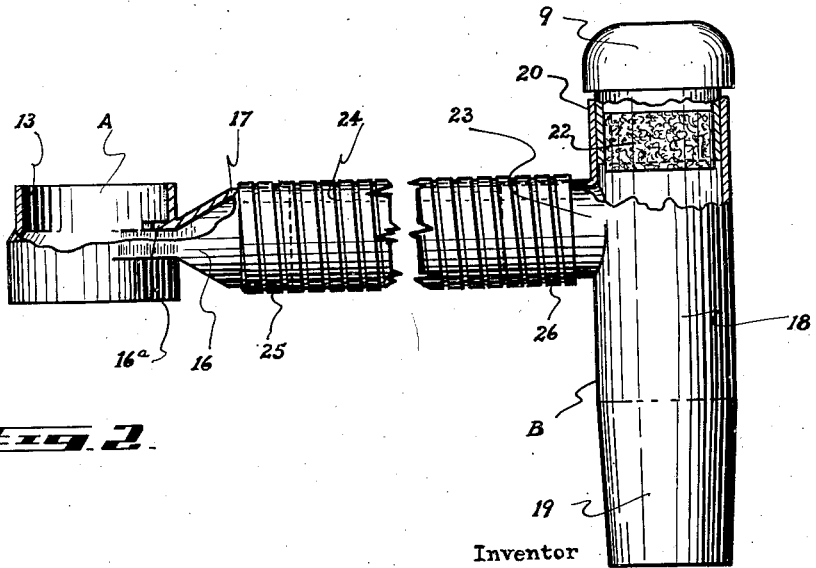

In the drawings:

Figure 1 is a side elevation of a conventional motor car engine with this improved crank case ventilator installed therein; and Figure 2 is an enlarged sectional elevation of the assembled device.

While most engine crank cases were formerly of the "closed" type, now practically all are vented in the front or side or have a port provided in the valve plate or rocker arm cover additional to the screened breather cap for the oil filling pipe. This, however, has proved insufficient for today's high speed driving and positive crank case ventilation is becoming recognized as essential to proper motor performance.

In the several attempts to provide a constant flow of fresh air through the crank case to carry off the harmful blow by gases, water vapor and acids, resort has been had to valved devices that in turn gummed up or the mechanism was underside or the suction proved inadequate. To overcome the cause of failure in its predecessors, this invention employs amply proportioned conduits and provides a direct and continually open passageway from the crank case to the air intake of the carburetor.

The engine 5 shown in the drawings has an air inlet port 6, entering the front and leading up into the built-in manifold and valve cover plate 7, and an oil filling pipe 8 normally covered with a screened breather cap 9. This system is unreliable and seems unable to meet the varying engine conditions so that sometimes the ventilation is satisfactory while at others the blow by gases issuing from the breather cap 9 seep through into the vehicle cab, sometimes the acids and water vapor are allowed to remain in the crank case and freeze or form sludge and sometimes the pressure in the crank case is sufficient to force the oil past the main bearing and into the clutch, causing the latter to slip.

In this positive and direct draft ventilator, the varying pressures in the crank case are easily cared for and without in any way disturbing the various speed adjustments of the carburetor; the oil fumes, gases and vapor being drawn off and fed directly into the air stream entering the air inlet of the carburetor. The instant appliance comprises an adapter A shown, in conjunction with the illustrated down-draft carburetor, as comprising a short pipe or stack 10, its open lower end 11 fitting down over the open air inlet of the carburetor 12 while its open upper end 13 is reduced in diameter just sufficient to be received with the collar 14 the air cleaner 15, so that it is in effect telescopically inserted between the two formerly attached parts. A shallow but wide passage 16 issues from the side of this stack 10 in the form of a relatively flat laterally elongated pipe that opens vertically and narrows horizontally into circular form as at 17. Along the upper edge of this opening in the stack, a short arcuate lip or ledge 16a projects into the stack for the entire width of the elongated opening.

A second adapter B in the form of a pipe or stack 18 that tapers slightly toward the open bottom 19 is inserted in the oil filling pipe 8. The upper open end 20, preferably of the same inside diameter as the oil pipe 8 is normally closed by the usual breather oil cap 9 that is effectively stopped with a cork 22. From the side of this stack 18 a short T stem 23 of about the same diameter extends at a suitable angle and this connects directly with the circular end 17 of the laterally issuing pipe 16 of the adapter stack 10 by a single length of flexible tubing 24 whose opposite ends 25 and 26 receive and embrace the respective lateral stems or horizontally projecting pipes 17 and 23 of the adapter stacks 10 and 18. Though the T stem 23 is here shown extending at right angles from the stack, it may be desired in some cases to have it extend upwards to prevent filling oil from passing off into the tube 24.

Actually what is necessary in carrying out my invention is an adapter insertable between the air filter and air intake of the carburetor easily attachable in any suitable way to both and provided with a lateral port, a second adapter connectable with one of the crank case ventilating ports and normally sealed at its outer end and also provided with a lateral port and a hose joining the respective lateral ports to afford direct communication between the spaced pair of adapters. One of the especial advantages attaching to the present invention is that the adapters in each case are easily and instantly applicable, necessitating no alteration to the motor structure or adjustments, requiring no extraneous fittings nor calling for any special tools. Attention may be drawn to the very short or shallow stack 10 of the adapter A whose lateral port, because of its design and configuration nevertheless affords ample cross-sectional area and yet terminates at its free end as a circular pipe readily receiving the same diameter of hose or tubing fitting to the oil filling pipe stack 18 of the other adapter B. The inwardly projecting horizontal lip along the upper side of the lateral port of this adapter serves to substantially increase the intake of crank case fumes by adding considerably to the so-called vacuum or pressure differential in the crank case. It will also be noted that though the stack 18 of the second adapter B is introduced into the oil filling pipe 8, and to operate successfully must be sealed against ingress other than from the crank case, it may still be used for oil filling purposes, being so proportioned as to readily receive the usual cap in its upper end, such cap merely being transformed from a breather cap to a seal-tight closure by the insertion of a cork stopper in its underside. In both cases it will be noticed that the inside diameter of the large end of the adapter corresponds substantially with the outside diameter of the smaller end.

It will thus be seen from the foregoing description, taken in connection with the accompanying drawings that a crank case ventilator is provided that will fulfil all the necessary requirements of such a device but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new and desire to secure by Letters Patent is:

1. A crank case ventilator for a motor vehicle having a vented crank case and an oil filling pipe, a carburetor and an air cleaner communicating with the air inlet opening of the carburetor; an adapter insertable between the carburetor and the air cleaner having a port in the side thereof, a narrow lip extending into said adapter above said lateral port and for the width thereof, a stack insertable in the oil filling pipe normally closed except for a port therein and a hose joining the respective ports of said adapter and stack.

2. A crank case ventilator for a motor vehicle having a vented crank case and an oil filling pipe, a carburetor and an air cleaner communicating with the air inlet opening of the carburetor; an adapter insertable between the carburetor and the air cleaner having a port in the side thereof; a second adapter in the form of a stack inserted in the oil filling pipe also having a port in the side thereof, said stack being normally closed at its upper end by the oil filling pipe cap plugged with a cork; a flexible hose connecting the ports of said adapters and a crank case draft increasing means comprising a narrow arcuate lip extending horizontally into the first mentioned adapter above the upper edge of the lateral port and continuing for the width thereof.

GEORGE GRIFFITH.

REFERENCES CITED

The following references are of record in the file of this patent:

UNITED STATES PATENTS

| Number | Name | Date |
|---|---|---|
| 2,185,501 | Dressler | Jan. 2, 1940 |
| 2,191,940 | Meckl | Feb. 27, 1940 |
| 2,244,403 | Root | June 3, 1941 |
| 2,271,150 | Dressler | Jan. 27, 1942 |